(12) United States Patent
Trudeau (10) Patent No.: US 11,703,958 B2
(45) Date of Patent: Jul. 18, 2023

(54) SYSTEM AND METHOD OF DISPLAYING VISUALIZATIONS ON A DEVICE

(71) Applicant: Benjamin Andrew Trudeau, Edmonds, WA (US)

(72) Inventor: Benjamin Andrew Trudeau, Edmonds, WA (US)

(73) Assignee: Benjamin Andrew Trudeau, Edmonds, WA (US)

( * ) Notice: Subject to any disclaimer, the term of this patent is extended or adjusted under 35 U.S.C. 154(b) by 0 days.

(21) Appl. No.: 17/039,484

(22) Filed: Sep. 30, 2020

(65) Prior Publication Data

US 2022/0100285 A1  Mar. 31, 2022

(51) Int. Cl.
| | | |
|---|---|---|
| *G06F 3/0346* | (2013.01) | |
| *G09G 5/38* | (2006.01) | |
| *G04G 9/00* | (2006.01) | |
| *G04G 21/02* | (2010.01) | |

(52) U.S. Cl.
CPC ............ *G06F 3/0346* (2013.01); *G04G 9/007* (2013.01); *G04G 21/02* (2013.01); *G09G 5/38* (2013.01); *G09G 2354/00* (2013.01); *G09G 2360/12* (2013.01)

(58) Field of Classification Search
CPC ...... G06F 3/0346; G04G 21/02; G04G 9/007; G09G 5/38; G09G 2354/00; G09G 2360/12
See application file for complete search history.

(56) References Cited

U.S. PATENT DOCUMENTS

| | | | | |
|---|---|---|---|---|
| 10,250,888 | B2* | 4/2019 | Jeong ................. | H04N 19/167 |
| 10,607,375 | B2* | 3/2020 | Fox ..................... | G09G 5/395 |
| 2011/0157231 | A1* | 6/2011 | Ye ...................... | G06F 3/0346 |
| | | | | 345/649 |
| 2013/0262298 | A1* | 10/2013 | Morley ............... | H04B 1/385 |
| | | | | 705/39 |
| 2014/0139454 | A1* | 5/2014 | Mistry ................ | G06F 3/041 |
| | | | | 345/173 |
| 2015/0185836 | A1* | 7/2015 | Slonneger .......... | G06F 3/0346 |
| | | | | 345/156 |
| 2017/0108936 | A1* | 4/2017 | Feinstein ............ | G06F 3/0346 |
| 2017/0109118 | A1* | 4/2017 | Ady .................... | G06F 3/1454 |
| 2019/0056854 | A1* | 2/2019 | Azzolin ............. | G06F 3/04886 |
| 2019/0340833 | A1* | 11/2019 | Furtwangler ........ | G06F 3/011 |

* cited by examiner

*Primary Examiner* — Bryan Earles
(74) *Attorney, Agent, or Firm* — Davis Wright Tremaine LLP (57) ABSTRACT

Systems and method herein describe an electronic display apparatus that is amendable to display different types of visualizations. In an embodiment, the electronic display apparatus has a circular display unit. The electronic display apparatus may display content but with some of the portions cut off from visibility to a user. The electronic display apparatus may include motion sensor units and data obtained from these motion sensor units may be used to cause a video controller to send a portion of the content from a frame buffer to the display device to enable the display of different areas of content. The content displayed to the user may change in accordance with movement initiated by the user.

20 Claims, 8 Drawing Sheets

SYSTEM AND METHOD OF DISPLAYING VISUALIZATIONS ON A DEVICE

BACKGROUND

A device, such as a smartwatch, includes one or more components to display one or more visualizations. Typically, the smartwatch includes at least a display unit (e.g., touch screen) with a viewing window for a user to view content. The display unit of the smartwatch may come in different shapes and sizes. In an example, a display unit of the smartwatch is circular in shape. However, most display instructions or code to display visualizations are typically written and configured for non-circular display units. Thus, if a web developer seeks to display visualizations on a smartwatch that is circular in shape, the web developer would need to recreate code specific for that type of display unit, which can be cumbersome. If the circular smartwatch receives code configured for a non-circular display, there may be instances where the smartwatch is unable to display the visualization. That is, visibility may be non-existent or perhaps limited due to content code being created for a non-circular display unit.

BRIEF DESCRIPTION OF THE DRAWINGS

Various techniques will be described with reference to the drawings, in which.

DETAILED DESCRIPTION

Techniques described herein are directed to a display apparatus (e.g., display device) that is amenable to display different visualization formats. That is, techniques described herein cause a display apparatus to display visualizations where code for the visualizations are originally created for a different type of display apparatus. Visualizations (also referred to herein as simply content) may comprise webpages, images, texts, objects, etc. that are typically created and coded to be displayed on a specific type of display apparatus. For example, a web developer generates code for content (e.g., a webpage) that is typically displayed using a rectangular screen (e.g., first shape). However, the display apparatus that receives the content may comprise a display unit that is a circular screen (e.g., a second shape that is different from the first shape). Typically, this would result in web developers having to create new code so that the visualization is displayed properly on the display unit with the second shape. Display units typically come in different shapes and sizes as they can be symmetric, asymmetric, regular polygons, irregular polygons, etc., so it would be advantageous to configure a display apparatus that is amenable to display different types of visualizations formats.

In an embodiment, without having to alter code or create new code, method and techniques described herein provide a way to display visualizations that are originally intended for a display apparatus with a first shaped display unit (e.g., square screen) to display the visualizations using a display apparatus with a second shaped display unit (e.g., circular screen). The display apparatus may include one or more components such as the display unit (e.g., touch screen), one or more motion sensor units (e.g., gyroscope, accelerometer, and/or magnetometer), wireless communication circuitry, input devices, processor, and/or memory. Each of these components and their functionalities are described in more detail with respect to FIG. 6 below. Components of the display apparatus may receive data from the one or more motion sensor units and cause the display unit to adjust how content is displayed to a user. In an embodiment, content is adjusted based on movement of the user in a way that the viewing window of the display apparatus is not obstructed.

In accordance with an embodiment, a method of displaying different areas of content in a direction corresponding to user movement of a display apparatus is described herein. In an embodiment, a display apparatus receives code from a web server. The code, when executed by a processor of the display apparatus, is configured to display content by a different type of display unit than the display unit of the display apparatus. Hence, the display unit of the display apparatus may display a portion of the content, but not its entirety. Accordingly, techniques described herein use a processor of the display apparatus to obtain data detected by one or more motion sensor units of the display apparatus to adjust the viewing window of the display unit such that different areas (e.g., areas that have been cut off from view) of the content can be displayed. Thus, as one skilled in the art will appreciate in light of this disclosure, certain embodiments are capable of achieving certain advantages, including configuring a display apparatus to be amenable to display visualizations of various formats. This way, code to display content do not necessarily need to be altered or recreated specifically for each type of display apparatus.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
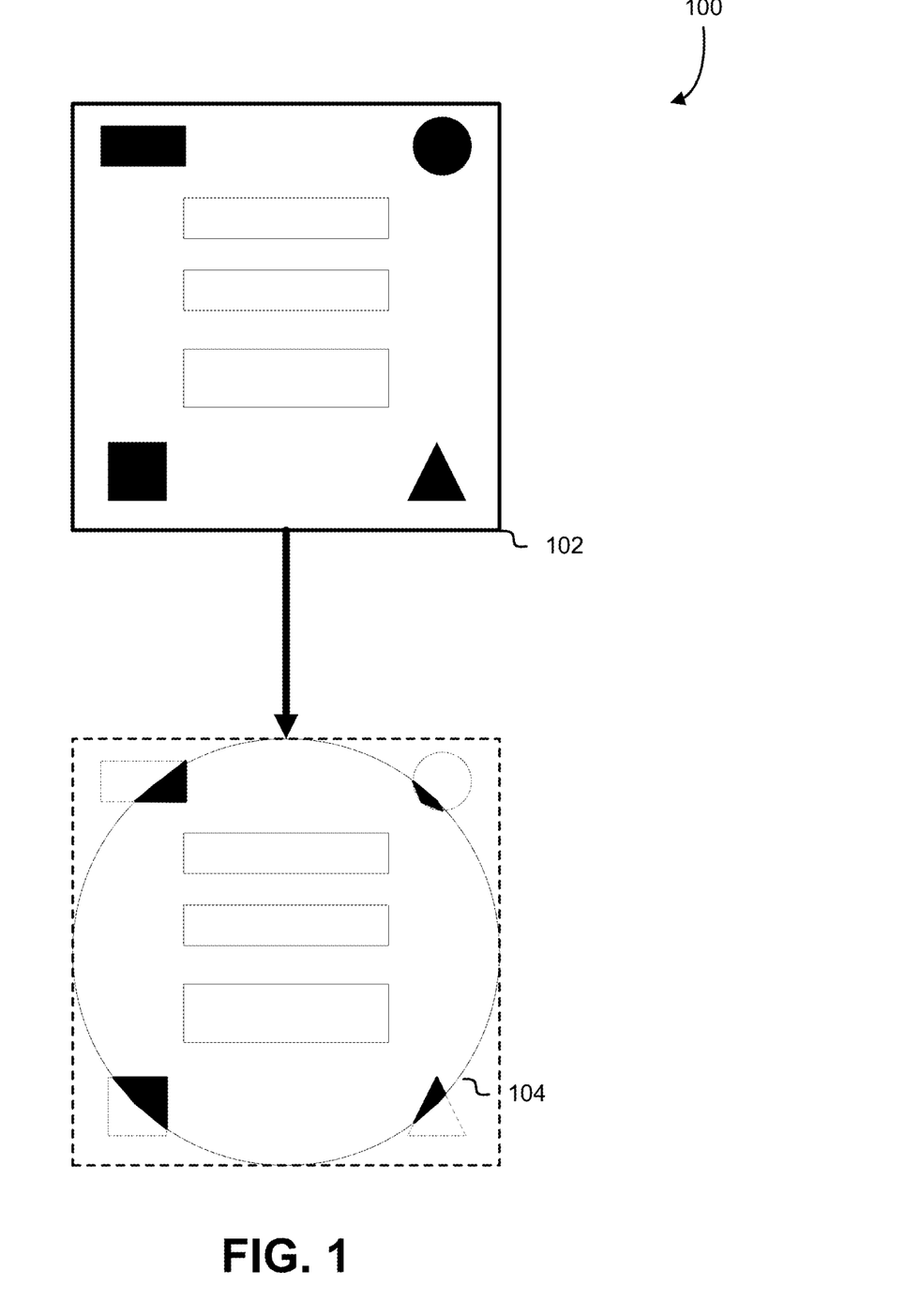
FIG. 1 includes illustrations of different display apparatuses displaying a visualization, according to at least one embodiment.

FIG. 1 includes illustrations 100 of a different display apparatuses displaying a visualization, according to at least one embodiment. In an embodiment, the both the display apparatuses 102, 104 is a smartwatch. However, a smartwatch is just one example as other types of display apparatuses may include a laptop computer, desktop computer, mobile phone, tablet, game console, point-of-sale (POS), personal digital assistants, wearable devices and/or e-readers, etc. In at least one embodiment, the smartwatch is a wearable device that includes a non-circular (e.g. square) display unit 102 that is configured to display visualizations (e.g., characters, graphics, words, digits, text, images, etc.). In an embodiment, the square display unit 102 is a Electroluminescent (ELD), Liquid Crystal Display (LCD), Light-Emitting Diodes (LED), Inorganic semiconductor micro-LED (microLED), Organic Light-Emitting Diode (OLED), Active-Matrix OLED (AMOLED), Plasma Display Panel (PDP), and/or Quantum Dot LED (QLED) that is a part of a display apparatus. In an embodiment, the square display unit 102 includes a touchscreen that is layered on top of the square display unit 102. A user may provide input (via a stylus or one or more fingers) to interact directly with the visualization that is being displayed. Other ways to interact and control the visualization may include receiving voice control commands from the user and/or instructions from a separate computing device (e.g., smartphone, laptop) via a wireless or wired connection. Sensors associated with the touchscreen may receive input from the user and cause signals to be generated and submitted to a processor of the display apparatus. The processor (which is described in more detail in FIG. 6 below) may then control the information being displayed on the display apparatus based on these received signals.

The display apparatus may receive content as markup language (e.g., hypertext markup language (HTML), extensible markup language (XML) from a web server (not depicted in FIG. 1). Content that has been prepared to be displayed is generally coded and created by a web developer. Web developers typically generate code so that content is displayed on a square display unit 102 such as the one shown in FIG. 1. Given that code is typically generated for a square display unit, a square display unit 102 would be able to display the entirety of the visualizations for a user. The user may then navigate contents on the square display device 102 via the touch screen inputs.

In an embodiment, instead of having a square display unit 102, a smartwatch includes a non-square display unit 104 (e.g., circular or round display unit). As mentioned above, the non-square display unit 104 may also comprise of at least one of an ELD, LCD, LED, microLED, AMOLED, PDP, and/or QLED. The smartwatch may receive content from the web server. In an embodiment, the content received is the same executable code that was provided by the web server to the square display device 102 described above. In this instance, the circular display unit 104 displays only a portion of the content. In a default or initial position, the display unit 104 of the smartwatch has a viewing window (or referred to herein as simply a view window) that is centered on the content but with some portions of the content cut-off from view. That is, when the smartwatch (with a circular display unit 104) receives code from the web server, the code may indicate where a focus of the display is and the display unit 104 defaults to a position that is centered at that focus (or at least as close to it as possible). In an embodiment, the circular display unit 104 displays the left of the focus if the focus is so far right that the display unit 104 would display information outside of the image (if the focus were centered). In an embodiment, if a user would like to view different portions of the content that is currently not visible to the user, the user may cause the display apparatus to move in different directions and/or tilt. As an example and as described in more detail with respect to FIGS. 2-7, the user may tilt the display apparatus in one direction, which then causes the display unit 104 to move its viewing window to display a different area of the content. That is, the display unit 104 may display a different area of the content according to the motion of the smartwatch. As an example, the displayed portion of the content changes in the direction of the movement. In another example, the displayed portion of the content changes in the direction opposite of the movement. Method and techniques directed to how the circular display unit 104 displays content in accordance with movement is described in more detail below with respect to FIGS. 2-7.

Figure 2:
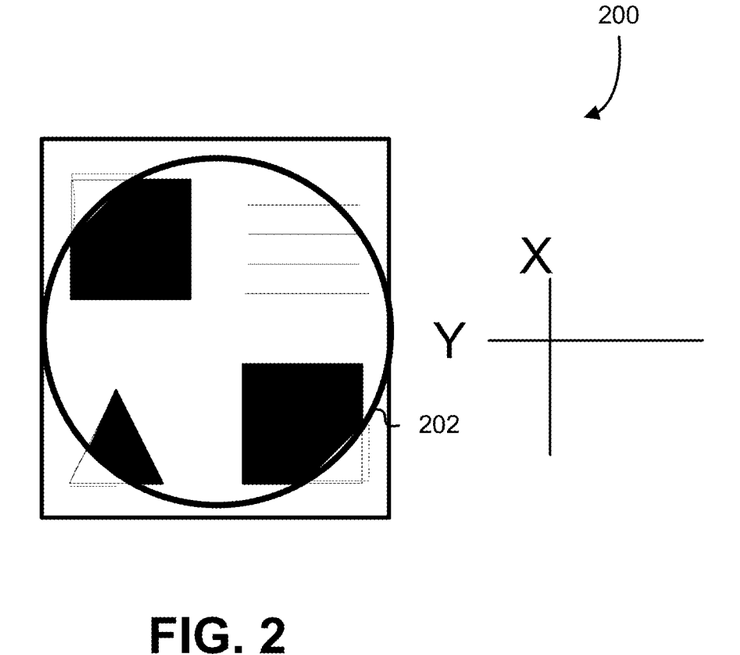
FIG. 2 is a diagram indicating portions of a visualization that are truncated when using a circular display apparatus, according to at least one embodiment.

FIG. 2 is a diagram 200 indicating portions of a visualization that are truncated when using a circular display unit 202, according to at least one embodiment. That is, in one embodiment, a display apparatus such as a smartwatch includes a circular display unit 202. As shown in FIG. 2, the circular display unit 202 may display about three-quarters of the content where some portions and objects in the content are cut-off or truncated from visibility to a user. In an embodiment, code received from a web server may cause a processor of the smartwatch to execute the code in such a way that only portions of the content are visible to a user in viewing window. This may happen when the code received, by a smartwatch (which has a circular display unit 202), is created to be executed by a non-circular display unit. As noted above with respect to FIG. 1, the code, when executed by the processor, may indicate where a focus of the display is and the viewing window of the display unit 202 defaults to be centered at that focus (or at least as close to it as possible). That is, in an embodiment, the viewing window of display unit 202 has a default position (e.g., initial position) that focuses on the center of the content. In an embodiment, the user causes the display device 202 to move so that additional content (e.g., portions that are currently truncated) can become visible to the user. The additional content may be displayed to the user in a way that appears more focused and closer to the user. A more detailed description on how additional content can be viewed is described in FIG. 3 below.

Figure 3:
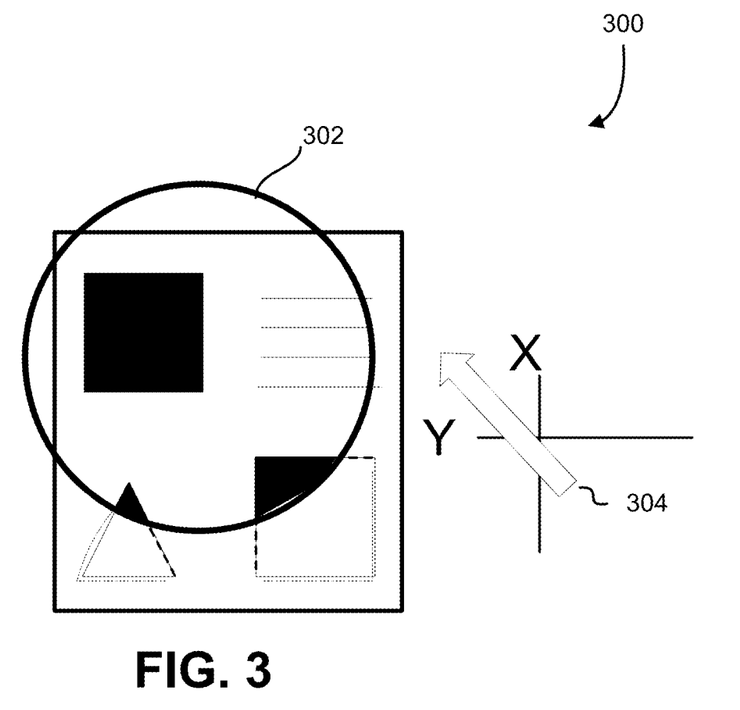
FIG. 3 is a diagram indicating how additional portions of a visualization that were previously truncated is now in view after movement of the apparatus, according to at least one embodiment.

FIG. 3 is a diagram 300 indicating how additional portions of a visualization that were previously truncated is now in view after movement of the apparatus, according to at least one embodiment. In an embodiment, a display unit (e.g., touch screen or simply screen) 302 of a smartwatch displays a different area of the content according to the motion of the display unit 302. As an example, the displayed portion of the content (e.g., view window) of display unit 302 changes in the direction of the movement (e.g., the user moves the display apparatus in one direction 304 and the view window also change and move in that same direction). That is, in an example, in a two dimensional (2-D) space (e.g., with respect to the X-Y axis shown in FIGS. 2 and 3), movement 304 in one direction by the display apparatus causes the view window of display unit 302 to also move in the same direction relative to the display screen. This way, different areas of content may be displayed to the user. In an embodiment, and as illustrated in FIG. 3, display unit 302 now illustrates the entirety of the box (an example object displayed as content) where previously when display unit 202 was in its initial position, the box was only partially visible to the user. As described in more detail below, if the view window moves to a point where it exceeds the boundary of the content, the smartwatch may cause these areas to be white or black in background color.

In another example, the view window may change in the direction opposite of the movement. That is, if the display apparatus moved in the North-West direction 304 relative to the screen, then the view window may display content that is of the South-East most portion relative to the screen. Note that, moving the smartwatch (which includes the display unit 302) in the North-West direction relative to the screen is just one example of movement and direction as other directions and movements may be initiated by the user. In an embodiment, movement and direction of the display apparatus is controlled by a user. In an embodiment, when a user is wearing the display apparatus (e.g., smartwatch), the user controls the movement and direction by physically moving the hand or body part where the smartwatch is attached. The direction and movement of the display apparatus is detected by one or more motion sensor units (e.g., gyroscope, accelerometer, and/or magnetometer). The method of using data from the one or more motion sensor units to control the contents in a view window is described in more detail with respect to FIGS. 6 and 7 below.

In other embodiments, the display apparatus detects a swiping or scrolling motion by the user on the touchscreen that causes the display unit 302 to move in the direction of the swiping or scrolling motion. In some embodiments, the user performs a pinch-in or pinch-out movement with their fingers to zoom to enlarge or shrink the viewing window on the smartwatch. In some embodiments, the user may input voice commands to the smartwatch to control the movement and direction. In some embodiments, a separate computing device (e.g., smartphone, laptop) may send commands to the smartwatch to control the movement and direction of the view window.

Figure 4:
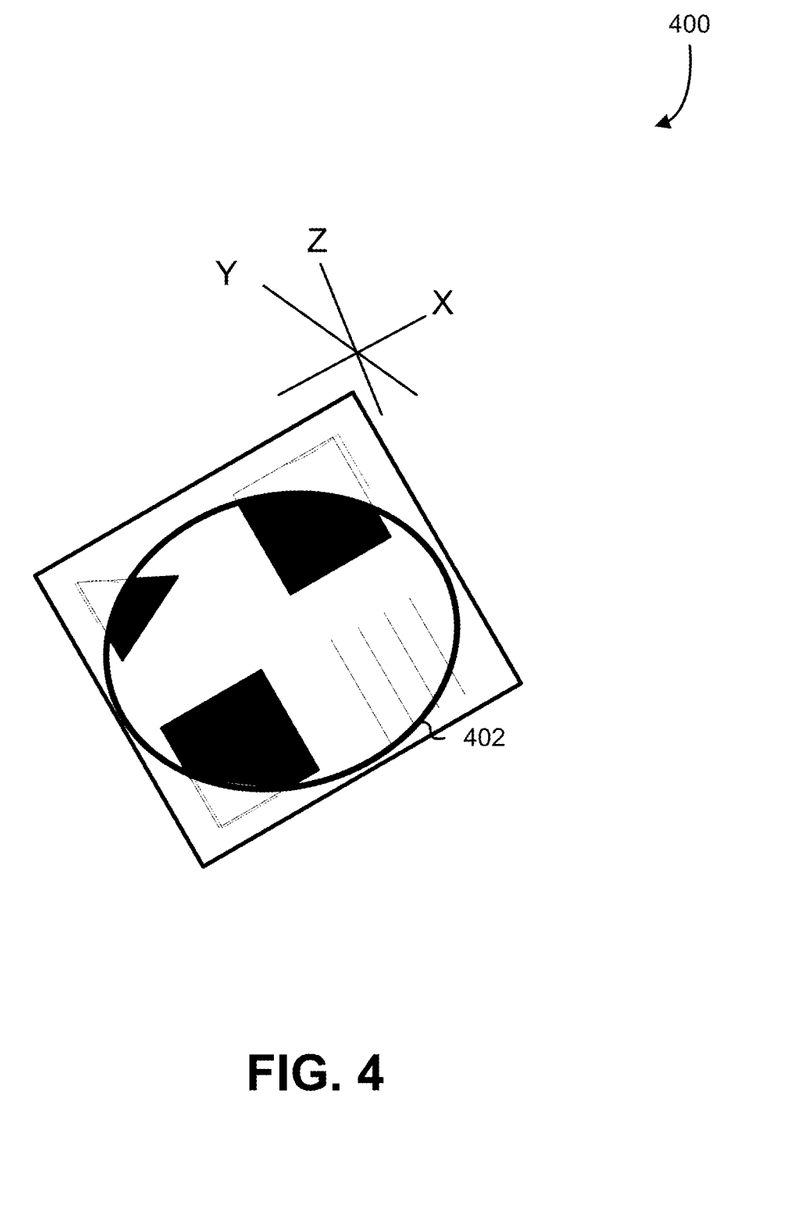
FIG. 4 is a diagram indicating portions of a visualization that truncated when using a tilted circular display apparatus, according to at least one embodiment.

FIG. 4 is a diagram 400 indicating portions of a visualization that are truncated when moving a circular display apparatus (which includes a circular display unit 402), according to at least one embodiment. In an embodiment, the direction of the display unit 402 is moved in the direction according to the movement on the display apparatus by a user. As noted above, the direction of the display unit 402 may be moved in the same direction of the display apparatus.

Moreover, as noted above, in an example, a display unit 402 displays content (e.g., view window) that has a focus on the center of the content (e.g., initial position) where any remaining portions of the content outside of the view window is truncated/not visible to the user. In an embodiment, as the display unit 402 moves in a direction, the view window also moves in that same direction and the initial position is now adjusted to focus on a different area of content. In some embodiments, the display unit 402 does not move if movement by user does not exceed a specified threshold value (e.g., a magnitude of movement). That is, any data detected by the one or more motion sensor units of the display apparatus may be received by a processor of the smartwatch. The processor may compare the received data with predetermined threshold values before determining whether to move the viewing window of display unit 402.

In an embodiment, the view window displays the content as much as the display unit 402 allows. That is, the view window is as large as the display unit 402 and all content that can be shown within the view window without extending beyond any boundary of the content is displayed to the user. In an embodiment, the view window moves to the boundary of the content, but no further. That is, the view window may move to an area of content such that the boundary of the content matches the boundary of the view window. In some instances, the view window moves past the boundary of the content. If so, the view window may display a white or black background for areas beyond the content boundary (as shown and briefly described in FIG. 3). In some embodiments, the view window returns (e.g., snaps back) to the initial position (focus on the center of the content) when the view window displays a completely white or black background (which indicates that no portions of the content is visible to the user anymore). After the view window moves to a different area of content, the content that was previously visible to the user may now be truncated or out of sight of the user.

In an embodiment, the content may be smaller than the view window and thus, only comprises a small part of the display unit 402. For example, the content is an image that does not take up the entirety of the view window. The image may be positioned in the center of the view window. Even though the entirety of the image (since it is smaller than the view window) is displayed, the user may still perform the techniques described herein where the viewing window moves along the direction of the display apparatus such that a different area of content is displayed in the viewing window.

In some examples, simple lateral or vertical movement of the display apparatus does not cause the display unit 402 to display different portions of the content. As described briefly above and in more detail below with respect to FIG. 6 below, the display unit 402 will not move unless the processor of the display apparatus determines that certain thresholds are met or unless directed by the user (e.g., via touch input or press button). In some embodiments and as described in more detail in FIG. 6 below, the display unit 402 is three-dimensional (3D). With a 3D display unit, the movement and direction of the display apparatus may be detected with respect to the X-Y-Z axis shown in FIG. 4. In an embodiment, movement and direction of the display apparatus is based on magnitude of the movement vector projected onto the plane of the display device (in the two dimensional case). However, in the 3D case, the magnitude of movement may be found by calculating the distance between two points and then taking the absolute value of that distance. After finding the magnitude of a vector, in the 3D space, the magnitude may be compared with previously stored magnitude values to determine whether the smartwatch is moving in that direction and whether the viewing window should be adjusted accordingly.

Figure 5:
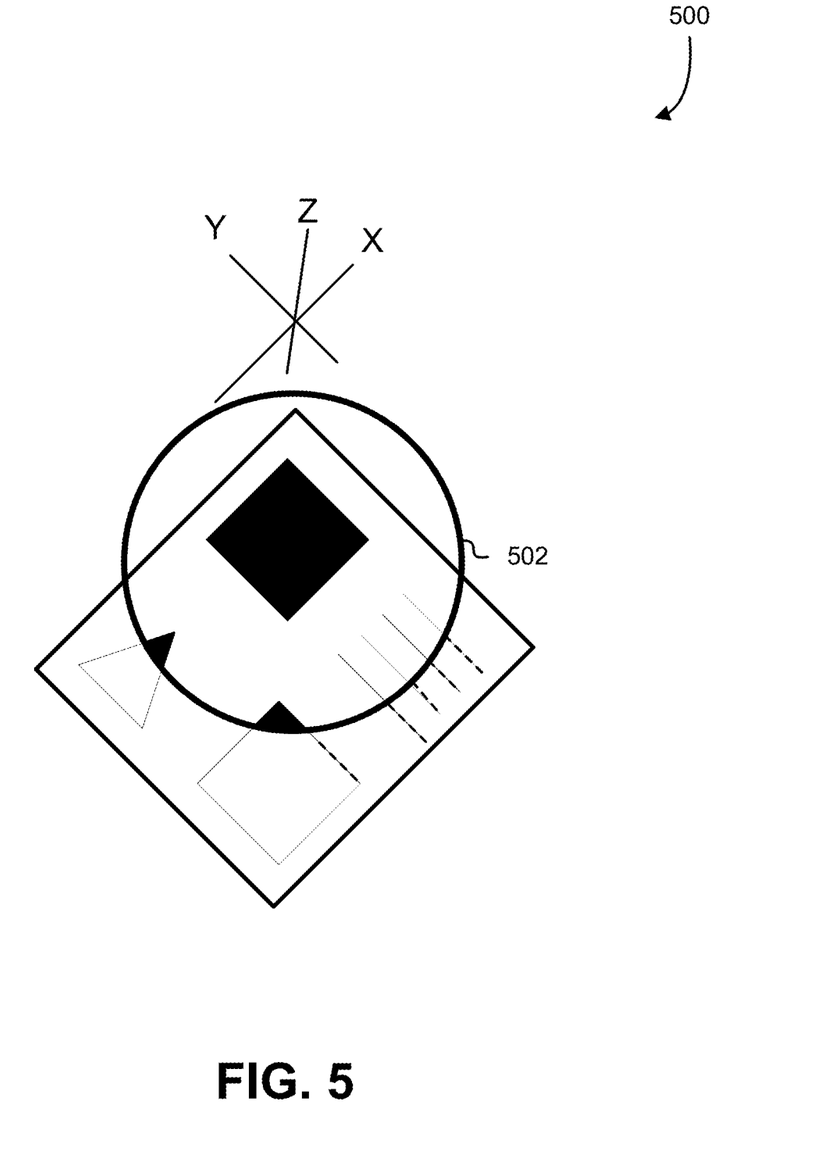
FIG. 5 is a diagram indicating additional portions of a visualization that are truncated when using a tilted circular display apparatus, according to at least one embodiment.

FIG. 5 is a diagram 500 indicating portions of a visualization that are truncated when using a tilted circular display apparatus 502, according to at least one embodiment. In an embodiment, when a display apparatus (e.g., smartwatch) 502 is tilted, it creates an "air bubble" and different portions of the content are now visible in a view window to the user. This is similar to when a user uses a compass and tilts the compass in a specific direction. In an embodiment, the display apparatus 502 is modeled as a compass that measures tilt in at least two directions. The curve of the glass in the model would indicate how much the bubble moves depending on the direction and magnitude of the tilt. In an embodiment, a maximum amount of tilt may be utilized to dictate the curvature of the model onto which the display apparatus is tilted. As noted below in FIG. 6, motion sensor units such as accelerometer 614, gyroscope 616, and magnetometer 618 are included in the display apparatus 502. Data from these motion sensor units may be processed by the display apparatus 502 to determine which areas and portions of the content to display to the user. As an example and as described above with respect to FIG. 1, the display apparatus 502 may display a different area of the content according to the motion of the display apparatus 502. As an example, the user may tilt the display apparatus 502 in one direction and the content changes in the direction of the movement. That is, in some embodiments, the tilting of the display apparatus 502 causes content previously not visible to the user to become visible.

Figure 6:
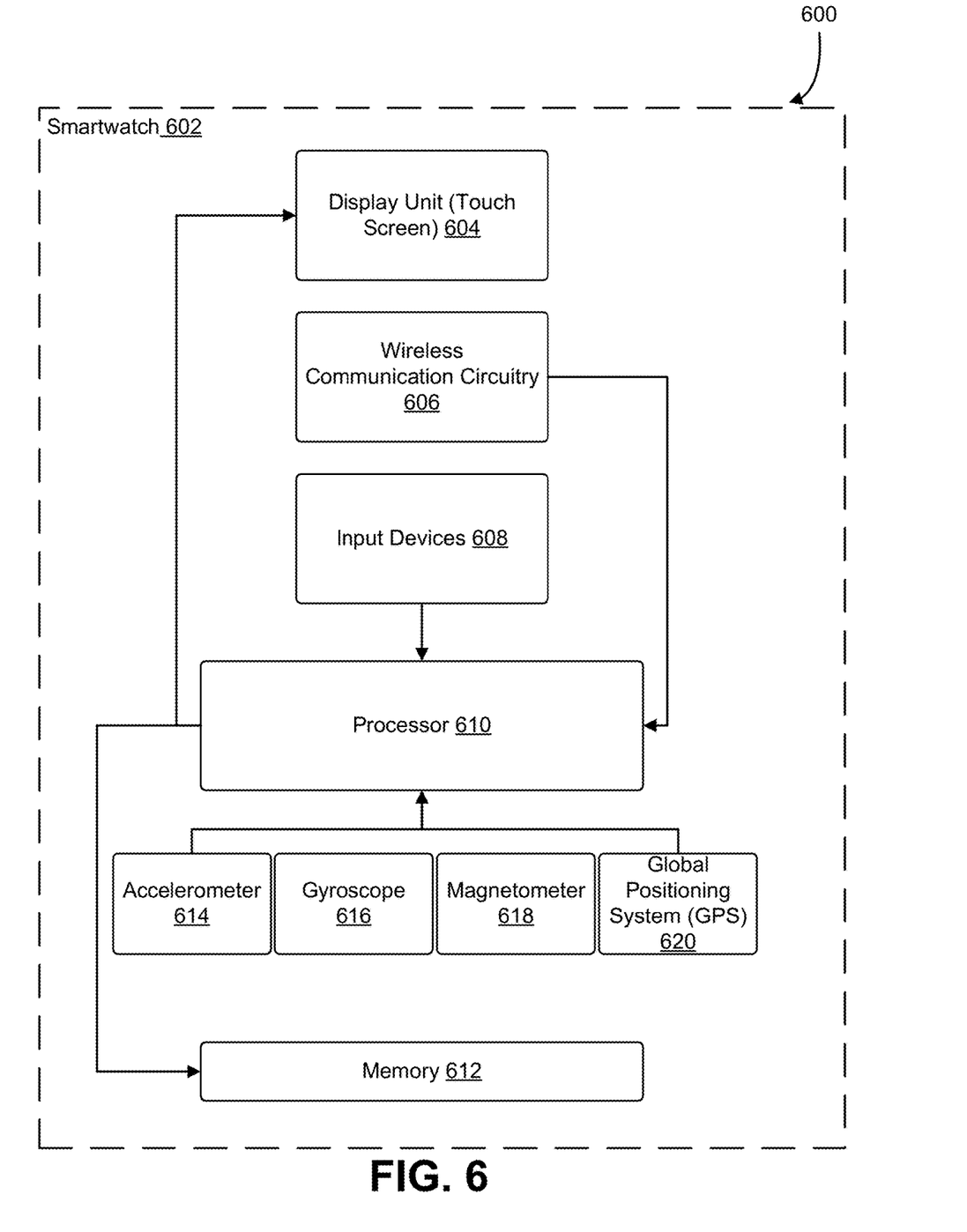
FIG. 6 is an illustration of an apparatus for displaying content on a display apparatus, according to at least one embodiment.

FIG. 6 is an illustration of an apparatus 600, such as a smartwatch, for displaying content, according to at least one embodiment. In an embodiment, smartwatch 602 includes various components such as a display unit (touch screen) 604, wireless communication circuitry 606, input devices (e.g., pushbutton switch, rotary dial) 608, processor 610, motion sensor units (e.g., accelerometer 614, gyroscope 616, magnetometer 618), a global positioning system (GPS) 620, and/or memory 612. In an embodiment, the display unit (touch screen) 604 is an LCD; however, other types of display units (which have been described above) is also possible. In an embodiment, the display unit 604 is non planar (three-dimensional) where content is displayed in different planes. In a non-planar display unit, the display unit may display content on a side curved surface. In an embodiment, the display unit (touch screen) 604 is configured to display images, objects, web content, text, and the like that are provided by a web server (not depicted in FIG. 6 but described in more detail in FIG. 8). In an embodiment, the display unit 604 includes touch screen capabilities. In some embodiments, the display unit 604 is simply referred to as the touchscreen. In an embodiment, the display unit 604 is circular or round. However, in some embodiments, the display unit 604 is non-circular (square or rectangular). As noted above, circular and non-circular shaped display units are just a few examples of a display unit as the display unit 604 may come in various shapes and sizes (e.g., symmetric, asymmetric, regular polygons, irregular polygons, etc.).

In an embodiment, wireless communication circuitry 606 is configured so that information may be transferred to the smartwatch 602 via cellular, wireless local area network (WLAN), Bluetooth, etc. The wireless communication circuitry 606 may communicate with the processor 610 to execute one or more wireless communication functions. As an example, voice or data (e.g., content from a web server or a different computing device) may be transmitted via the wireless communication circuitry 606 to the processor 610. In an embodiment, input devices 608 includes a push button and/or a rotary dial. A user may control functions of the smartwatch 602 using at least one of these input devices 608. The input devices 608 may then send a signal to the processor to perform a device function based on an operation that the user has selected. As an example, the user may turn on/off the smartwatch 602 using the input device 608 (e.g., by pressing the push button for a certain period of time).

In an embodiment, a processor 610 is included in the display unit (touch screen) 604 so that it receives varying inputs made by a user. As noted above, the processor 610 may be configured to execute instructions to cause the smartwatch 602 to perform one or more operations (e.g., power on/off, load content on the display unit) under the direction of the user. In an embodiment, a web server provides content to the smartwatch 602 via the wireless communication circuitry 606. The content is a document configured according to a markup language (e.g., HTML, XML) and a browser of the smartwatch 602 has instructions for rendering the content. In some embodiments, the smartwatch 602 has a display unit that is circular. Without having to alter the content provided by the web server, the processor 610 of smartwatch 602 may cause the display unit 604 to display a portion of the content. As an example and as shown in FIG. 2, the smartwatch 602 displays just the center portions of the content whereas the edge portions of the content are cut off from visibility. In some embodiments, the processor 610 receives data from the motion sensor units that detect certain movements of the smartwatch 602 and cause the display unit 604 to move such that different portions of the content is now in the viewing window for the user.

In an embodiment, the processor is also configured to receive data from motion sensor units (e.g., an accelerometer 614, gyroscope 616, and magnetometer 618). In an embodiment, data associated with the direction, tilt, and/or acceleration of the smartwatch 602 is received by the processor 610. In an embodiment, an accelerometer 614 is a sensor unit in smartwatch 602 that is configured to handle axis-based motion sensing. In an embodiment, the accelerometer 614 also provides data to the processor 610 to indicate which direction the smartwatch 602 is pointing. In an embodiment, the accelerometer 614 also measures the speed or acceleration with respect to the movements of the smartwatch 602. In an embodiment, a predetermined threshold value of speed or acceleration may be stored in memory 612. Any data received by the processor from the accelerometer may be compared with the previously stored predetermined threshold value before indicating that movement is actually taking place and directing the display unit 604 to move. This way, it would help eliminate any false positives where a user just makes very small movements with no intention of causing the smartwatch 602 to move. That is, in an embodiment, some sort of movement (e.g. a jerk of magnitude over a threshold) indicates that the viewing window should move so that the user can keep the viewing window in the same place unless the user wants to move it. The jerk of magnitude over a threshold may equivalent to an angular speed of tilt over a threshold, where the angular speed goes from positive to negative or negative to positive within some predetermined amount of time (e.g., time threshold). In an embodiment, the movement of the viewing window is "sticky." For instance, if the user tilts the smartwatch to move the viewing window in one direction, the viewing window may not move back when the user tilts the smartwatch back until the user somehow indicates for it to move back (e.g., with a jerk or other indicator). In an embodiment, the viewing window is set in a desired location as the user moves around. This way, the viewing window is not moving from the last place that the user intended it to be. In an embodiment, the user taps the touch screen 604 or a button press to prevent the viewing window from moving.

In an embodiment, a gyroscope 616 provides data to the processor 610 to indicate which direction the smartwatch 602 is orientated. That is, the gyroscope 616 measures the tilt of the smartwatch 602. In some embodiments, the gyroscope 616 measures the speed of the tilt. The tilting speed may be received by the processor 610 and the processor 610 may determine the length of time content is made visible to the user before it moves to another part of the content. As noted above, the processor may also receive data from the gyroscope 616 and compare it with predetermined threshold values stored in memory 612. The processor 610 may determine whether the speed of tilt measured by the gyroscope 616 meets or exceeds a predetermined threshold value before directing the display unit 604 to move. For example, the speed at which the viewing window of the smartwatch 602 moves is proportional to the angle of tilt with respect to an upper limit on the speed of movement. That is, the movement of the viewing window may be controlled based on the angular speed of the tilt, where higher angular speed can indicate that the viewing window of the smartwatch 602 should move faster. This way, faster tilts by the user causes the viewing window to move faster, and slow tilts causes the viewing window to move slower. Moreover, the speed of movement may also depend on the size of the viewing window of the smartwatch 602 relative to the size of the frame buffer of the smartwatch.

In an embodiment, a user adjusts a calibration setting that would allow the user to define a default angle for the gyroscope 616. Individuals with different heights and arm lengths may prefer a wide range of viewing angles of the display when using the device. Thus, providing the user the ability to set their preferred viewing angle when engaging the wearable display would generate an improved user experience. As an example, one person may need to hold wrist close to face in order to see while another person may prefer to look down at their wrist closer to waist level. Thus, users would be able to calibrate their preferred display viewing angle so that gyroscope rotation is more accurately responsive to individual use.

In an embodiment, a magnetometer 618 is another sensor unit included in the smartwatch 602. The magnetometer 618 may measure the magnetic fields and provide data to the processor 610 to indicate which direction is North/South/East/West. Although not depicted in FIG. 6, the smartwatch 602 is not limited to the sensors disclosed herein and thus, may also include other sensors such as biometric sensors, barometers, proximity sensors, and/or ambient light sensors.

In an embodiment, the smartwatch 602 also includes a GPS 620. In an embodiment, the GPS 620 is configured to communicate with satellites to determine the current location of the smartwatch 602. In an embodiment, the GPS calculates the current position of a user (while wearing the smartwatch 602). In an embodiment, as the user (while wearing the smartwatch 602) moves (e.g., either via walking or driving), the display unit 604 displays a map that indicates to the user the current location of the user relative to the map. The display unit 604 may continue to display the map and provide updated positions to the user based on the user's movement. In an embodiment, the processor 610 is coupled to memory 612. In an embodiment, the memory 612 stores data received from sensor units (e.g., accelerometer 614, gyroscope 616, and magnetometer 618). In some embodiments, the user may store data such as audio, images, and/or text in memory 612.

Figure 7:
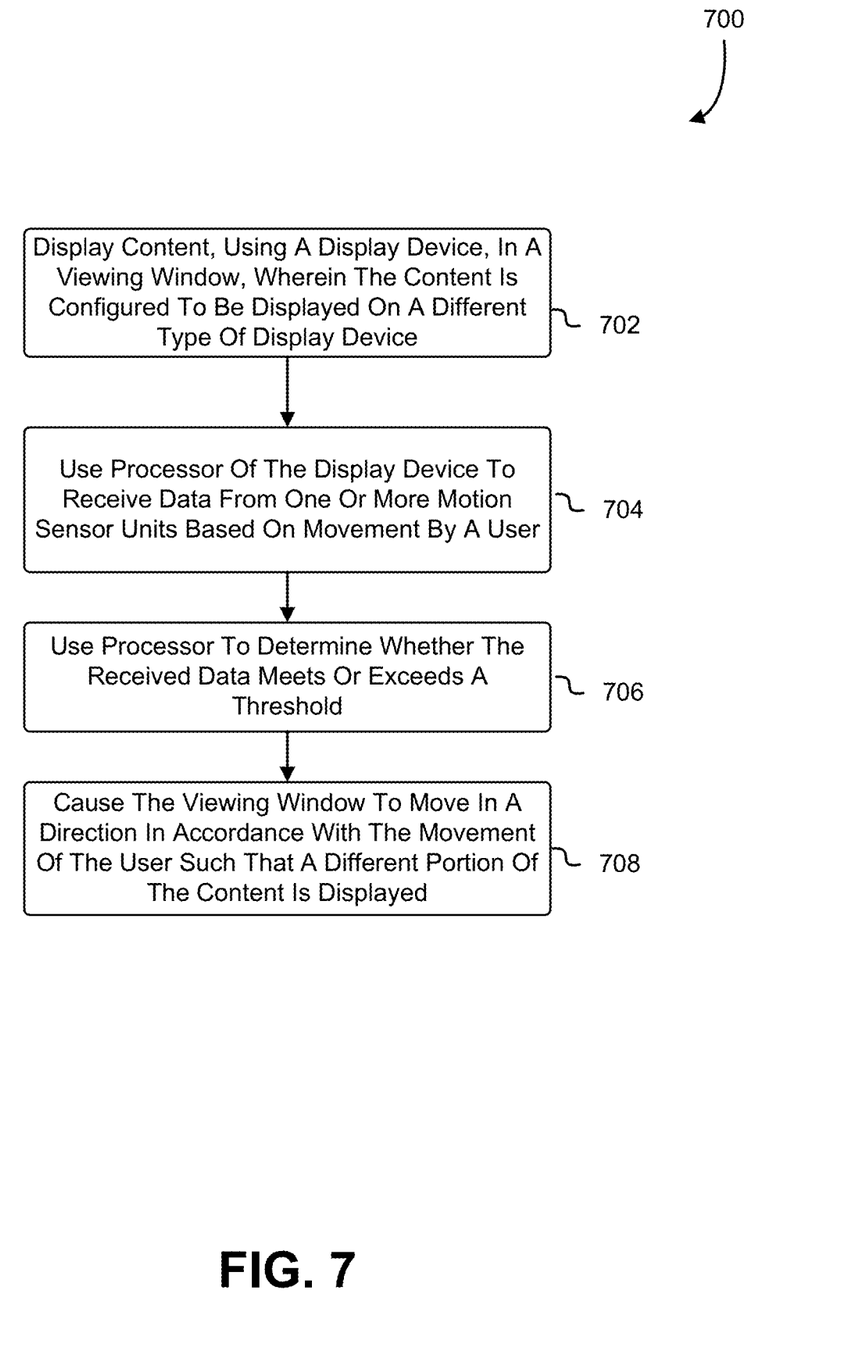
FIG. 7 is a flowchart indicating a process of using a display apparatus to display visualizations, according to at least one embodiment.

FIG. 7 is a flowchart indicating a process 700 of providing content using a display apparatus, according to at least one embodiment. In an embodiment, a display apparatus such as a smartwatch, receives code from a web server to display content. In an embodiment, code is received as a result of a software developer generating the code using a separate device. In some instances, the smartwatch receives code to display content other than from a web server (e.g., from a desktop computer or personal laptop). In an embodiment, the smartwatch includes a wristband that can be attached to a body part on the user. In some instances, the user is in possession (e.g., in the pocket of the user or in the hand of the user) of the smartwatch without being physically attached to the user.

In an embodiment, the smartwatch comprise a web browser that sends one or more requests for content to a web server. In an embodiment, the web server responds to the one or more requests with executable code (or in some instances an HTML document). The code may be generated by web developers for content to be displayed on a square display unit. However, in some instances, the smartwatch includes a circular display unit. As such, the smartwatch executes the code received from the web browser and displays content using a circular display unit even though the code was created to display content for a display unit shaped differently 702. Based on this discrepancy, the circular display unit of the smartwatch may only display a portion of the content. The viewing window of the display unit may focus on the center of the content and some portions of the content may not be visible to the user. As an example, the smartwatch displays about 75% of the content and the remaining 25% (e.g., four corners/edges) of the content are cut off from visibility to the user. If the user wanted to obtain visibility of a corner/edge that is cut off, the user may move the smartwatch in a direction to view that corner/edge of the content. As mentioned above, the user may tilt the smartwatch in one direction, which then causes the display unit to move its viewing window to display a different area of the content according to the motion of the smartwatch. In one example, the displayed portion of the content changes in the direction of the movement. In another example, the displayed portion of the content changes in the direction opposite of the movement.

In an embodiment, the smartwatch includes one or more components in addition to the display unit. For example, the smartwatch includes a processor, wireless communication circuitry, input devices (e.g., pushbutton switch, rotary dial), motion sensor units (e.g., accelerometer, gyroscope, magnetometer, a global positioning system (GPS), and/or memory. In an embodiment, the processor receives data from the one or more motion sensor units based on movements initiated by the user while wearing or in possession of the smartwatch 704. In an embodiment, the accelerometer of the one or more motion sensor units handles axis-based motion sensing. In an embodiment, the gyroscope provides data to the processor to indicate which direction the smartwatch is orientated. That is, the gyroscope measures the tilt of the smartwatch. In some embodiments, the gyroscope also measures the speed of the tilt. In an embodiment, the magnetometer measures the magnetic fields and provides data to the processor to indicate which cardinal direction (North/West/East/South) the smartwatch is facing. In an embodiment, a predetermined threshold value with respect the magnitude of movement (e.g., speed or acceleration) is stored in memory of the smartwatch. Thus, any data received by the processor from the one or more motion sensor units may be compared with the previously stored predetermined threshold values 706. The processor may use information from the comparison to control movement of the viewing window of the smartwatch 708 so that additional content (e.g., a corner that was not previously visible to the user) can be visible.

Figure 8:
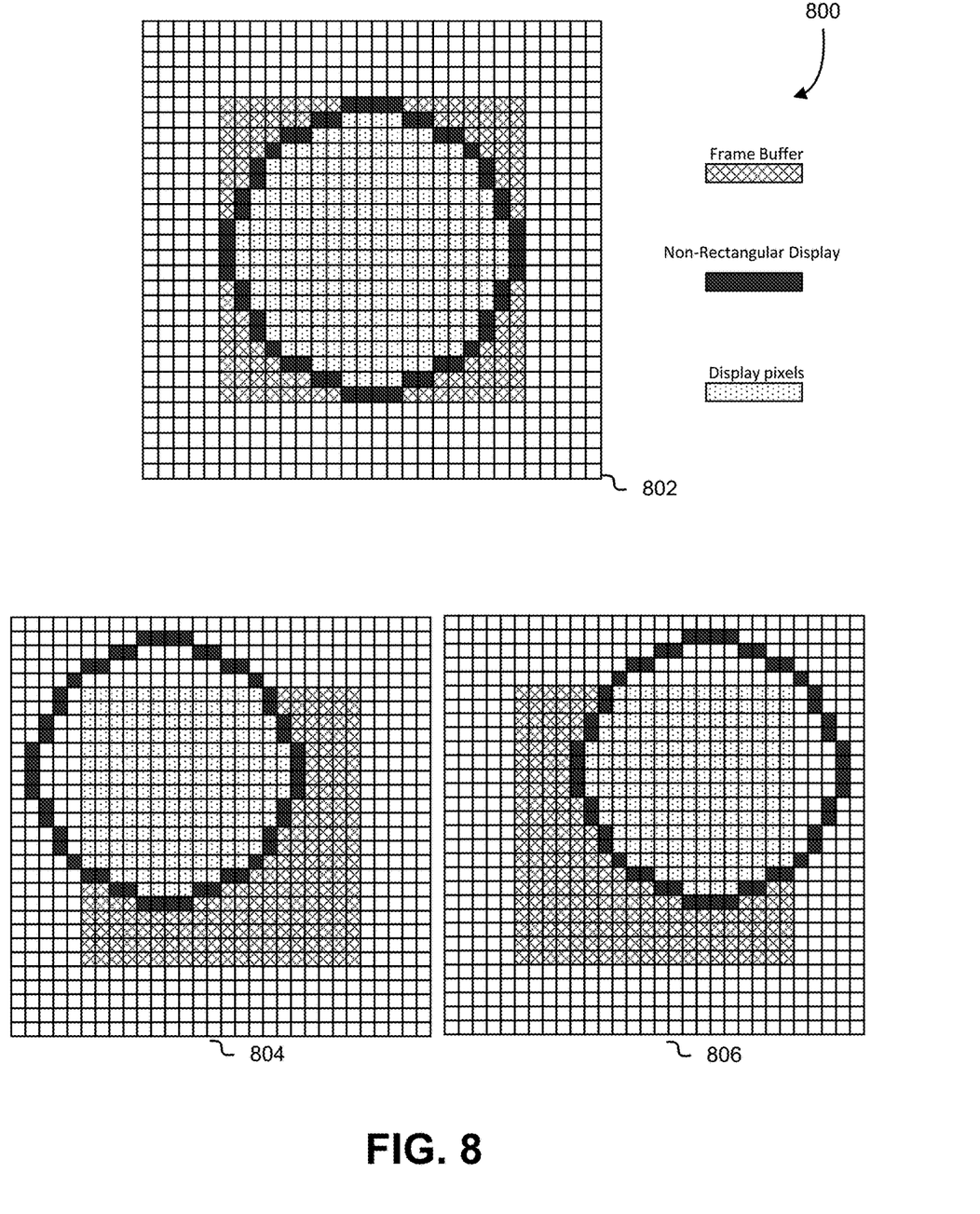
FIG. 8 is an example illustrating how a display apparatus is used to display visualizations, according to at least one embodiment.

FIG. 8 is an example illustration 800 how a display apparatus is used to display visualizations, according to at least one embodiment. In most systems, with a rectangular display, the visual data is stored in the video random-access memory (RAM) on a graphics card in what is called a frame buffer. The data stored in the frame buffer would generally correlate directly with the pixel values on a rectangular display. The frame buffer is read by the video controller and that data is sent to the display. In a situation where the display is circular (or non-rectangular in shape) and the software/visual data was programed for a rectangular display, the frame buffer would provide an area larger or non-conforming to the same dimensions of the pixel values found on the non-rectangular display 802. In this situation, data from a gyroscope may be used to manipulate which data in the frame buffer would be sent by the video controller to which pixel values on the display. Using the rotational data from two planes, or around two axes, these two data streams from the gyroscope may provide "two-dimensional (2D)"

manipulation of the visual data ultimately displayed. The end result would allow the user to physically manipulate which portion of the frame buffer is presented to the display by tilting the display in three-dimensional (3D) space. As an example, a user may tilt or move the display in a first direction to display a certain area of the content 804. In another example, a user may tilt or move the display in a second direction (opposite of the first direction) to display a different area of content 806. As an illustration, the non-rectangular display as a window through which you are seeing a portion of a picture that would represent the frame buffer, tilting the gyroscope would result in the picture moving horizontally or vertically behind the window.

In an embodiment, the non-rectangular display (as outlined by black boxes in FIG. 8) moves in the direction (or opposite the direction) of tilt a set amount of pixels per second until the border of the non-rectangular display reaches the edge of the frame buffer. In an embodiment, and as mentioned above, if the view window of the non-rectangular display moves to a point where it exceeds the boundary of the content (e.g., past the frame buffer), these areas may display white or black in background color. In an embodiment, instead of a white or black background color, the area may display a static image for the portions of the non-rectangular display past the frame buffer.

Figure 9:
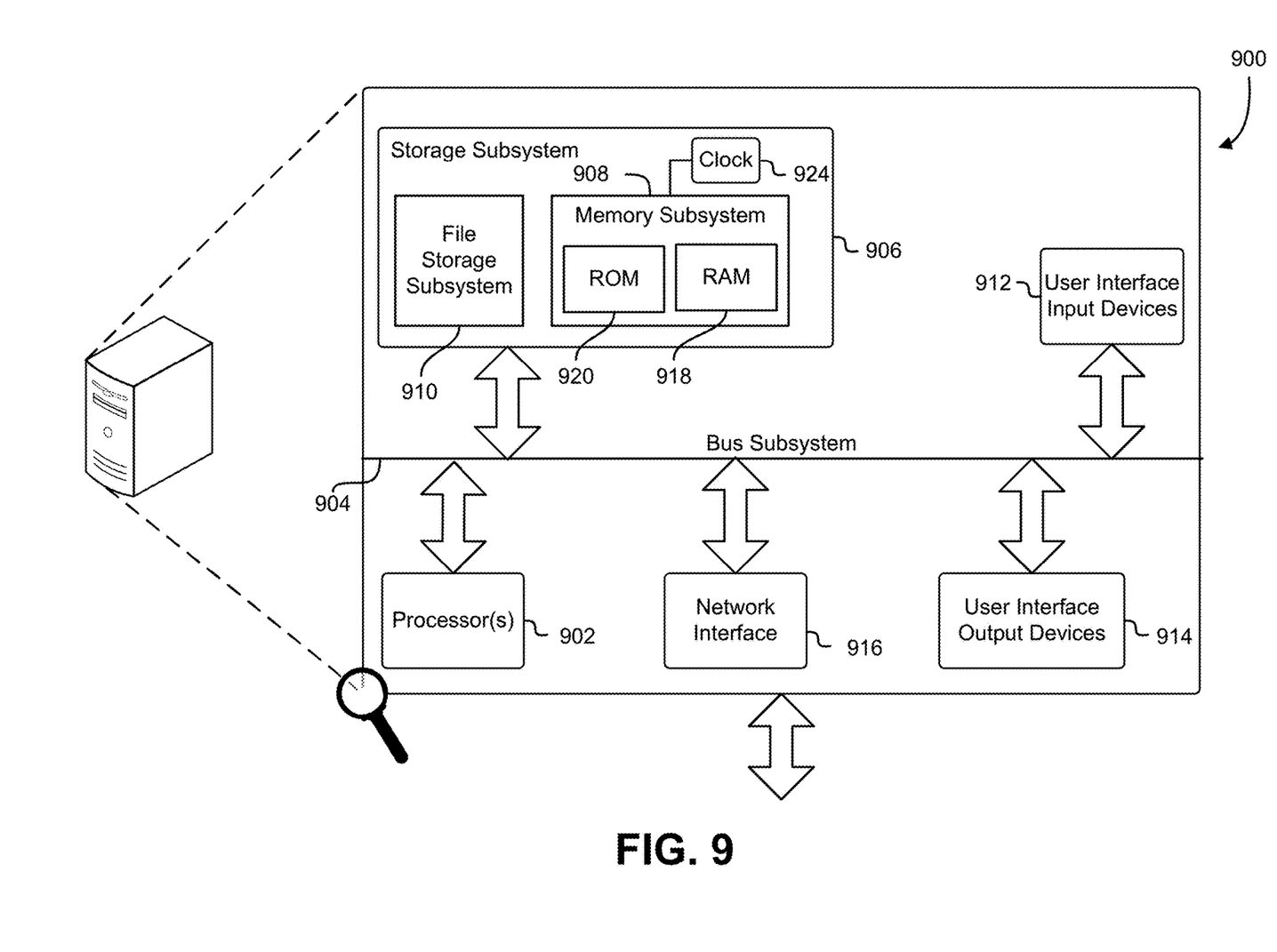
FIG. 9 illustrates an environment in which various embodiments can be implemented.

FIG. 9 is an illustrative, simplified block diagram of a computing device 900 that can be used to practice at least one embodiment of the present disclosure. In various embodiments, the computing device 900 includes any appropriate device operable to send and/or receive requests, messages, or information over an appropriate network and convey information back to a user of the device. The computing device 900 may be used to implement any of the systems illustrated and described above. For example, the computing device 900 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 900 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 9, the computing device 900 may include one or more processors 902 that, in embodiments, communicate with and are operatively coupled to a number of peripheral subsystems via a bus subsystem. In some embodiments, these peripheral subsystems include a storage subsystem 906, comprising a memory subsystem 908 and a file/disk storage subsystem 910, one or more user interface input devices 912, one or more user interface output devices 914, and a network interface subsystem 916. Such storage subsystem 906 may be used for temporary or long-term storage of information.

In some embodiments, the bus subsystem 904 may provide a mechanism for enabling the various components and subsystems of computing device 900 to communicate with each other as intended. Although the bus subsystem 904 is shown schematically as a single bus, alternative embodiments of the bus subsystem utilize multiple buses. The network interface subsystem 916 may provide an interface to other computing devices and networks. The network interface subsystem 916 may serve as an interface for receiving data from and transmitting data to other systems from the computing device 900. In some embodiments, the bus subsystem 904 is utilized for communicating data such as details, search terms, and so on. In an embodiment, the network interface subsystem 916 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 916 is enabled by wired and/or wireless connections and combinations thereof.

In some embodiments, the user interface input devices 912 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 900. In some embodiments, the one or more user interface output devices 914 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 900. The one or more user interface output devices 914 can be used, for example, to present user interfaces to facilitate user interaction with applications performing processes described and variations therein, when such interaction may be appropriate.

In some embodiments, the storage subsystem 906 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 906. These application modules or instructions can be executed by the one or more processors 902. In various embodiments, the storage subsystem 906 additionally provides a repository for storing data used in accordance with the present disclosure. In some embodiments, the storage subsystem 906 comprises a memory subsystem 908 and a file/disk storage sub system 910.

In embodiments, the memory subsystem 908 includes a number of memories, such as a main random access memory (RAM) 918 for storage of instructions and data during program execution and/or a read only memory (ROM) 920, in which fixed instructions can be stored. In some embodiments, the file/disk storage subsystem 910 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 900 includes at least one local clock 924. The at least one local clock 924, in some embodiments, is a counter that represents the number of ticks that have transpired from a particular starting date and, in some embodiments, is located integrally within the computing device 900. In various embodiments, the at least one local clock 924 is used to synchronize data transfers in the processors for the computing device 900 and the subsystems included therein at specific clock pulses and can be used to coordinate synchronous operations between the computing device 900 and other systems in a data center. In another embodiment, the local clock is a programmable interval timer.

The computing device 900 could be of any of a variety of types, including a portable computer device, tablet computer, a workstation, or any other device described below. Additionally, the computing device 900 can include another device that, in some embodiments, can be connected to the computing device 900 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 900 for processing. Due to the ever-changing nature of computers and networks, the description of the computing device 900 depicted in FIG. 9 is intended only as a specific example for purposes of illustrating the preferred embodiment of the device. Many other configurations having more or fewer components than the system depicted in FIG. 9 are possible.

In an embodiment, a web server provides content to computing device 900. That is, in an embodiment, content are provided to computing device 900, which may include devices such as smartwatches, glasses, art display devices, and/or tablets, etc. The computing device 900 may utilize the techniques described herein to display visualizations that are configured for a specific type of display device even though the computing device 900 that receives the web content is configured to display a different type of visualization.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 900 may include any appropriate hardware, software and firmware for integrating with a data store as needed to execute aspects of one or more applications for the computing device 900 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 900 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 900 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 900 may provide the content in one or more forms including, but not limited to, forms that are perceptible to the user audibly, visually, and/or through other senses. The handling of requests and responses, as well as the delivery of content, in an embodiment, is handled by the computing device 900 using PHP: Hypertext Preprocessor. (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 900 typically will include an operating system that provides executable program instructions for the general administration and operation of the computing device 900 and includes a computer-readable storage medium (e.g., a hard disk, random access memory (RAM), read only memory (ROM), etc.) storing instructions that if executed (e.g., as a result of being executed) by a processor of the computing device 900 cause or otherwise allow the computing device 900 to perform its intended functions (e.g., the functions are performed as a result of one or more processors of the computing device 900 executing instructions stored on a computer-readable storage medium).

In an embodiment, the computing device 900 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 900 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 900 is capable of storing, retrieving, and accessing structured or unstructured data. In an embodiment, computing device 900 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A computer-implemented method of displaying content, comprising:
  displaying, via a viewing window of a display device attached to a user, a portion of content, wherein the content is configured to be displayed on a display device that is different from the display device where a second portion of content is to be truncated from the viewing window of the display device; and
  using a processor of the display device to:
    receive data from one or more motion sensor units comprising an accelerometer, gyroscope, and magnetometer based on movement by the user;
    cause a video display controller of the display device to send the second portion of content from a frame buffer to the display device after receiving the data from the one or more motion sensor units;
    cause the viewing window to move in a direction in accordance with the movement of the user, while the portion of content remains stationary, wherein the viewing window, when moved, displays a subset of the portion of content and the second portion of content received from the frame buffer, such that the viewing window moves beyond the content to display one or more edges of the content and wherein the viewing window is to be moved in the direction in accordance with the movement based on the received data from the one or more motion sensor units indicating a jerk of magnitude that exceeds a threshold.

2. The computer-implemented method of claim 1, wherein the process of the display device executes code usable to display content that is configured for a square shaped display device.

3. The computer-implemented method of claim 1, wherein the display device is of circular shape.

4. The computer-implemented method of claim 1, wherein movement by the user further comprises tilting the display device in a direction indicated by the user.

5. The computer-implemented method of claim 4, wherein tilting the display device further comprises receiving, at the processor, directional data from a gyroscope of the one or more motion sensor units.

6. The computer-implemented method of claim 1, wherein the portion of content displayed on the display device is based on directional data received from the gyroscope.

7. The computer-implemented method of claim 1, wherein the display device is a smartwatch.

8. A system, comprising:
one or more processors;
memory that stores computer-executable instructions that are executable by the one or more processors to cause the system to:
receive executable code to display content;
display a portion of the content using a viewing window of a circular display unit, wherein the executable code to display the content is configured for a square display unit such that a second portion of the content is to be truncated from the viewing window of the circular display unit;
receive data from one or more motion sensor units comprising an accelerometer, gyroscope, and magnetometer caused by movements initiated by a user attached to the system;
cause a video display controller of the circular display unit to send the second portion of content from a frame buffer to the circular display unit after receiving the data from the one or more motion sensor units;
cause the second portion of the content to be displayed by adjusting the viewing window, while the portion of the content remains static, to focus on a subset of the portion of the content and the second portion of the content received from the frame buffer and in accordance with a direction of the movement caused by the user, such that the viewing window moves beyond the content to display one or more edges of the content and
wherein the viewing window is to be moved in the direction in accordance with the movement based on the received data indicating a jerk of magnitude that exceeds a threshold.

9. The system of claim 8, wherein the instructions that are executable by the one or more processors further cause the system to display the second portion of the content without having to obtain additional executable code.

10. The system of claim 8, wherein the instructions that are executable by the one or more processors further cause the system to determine whether the received data from the one or more motion sensor units meets or exceeds one or more threshold values previously stored in the memory, wherein the one or more threshold values comprise a predetermined magnitude of movement.

11. The system of claim 8, wherein the one or more motion sensor units comprise an accelerometer, gyroscope, and magnetometer.

12. The system of claim 8, wherein the second portion of the content is displayed based on data received from each of the one or more motion sensor units.

13. The system of claim 8, wherein the system is a smartwatch that comprises the circular display unit.

14. A smartwatch, comprising:
a processor;
a display unit;
memory; and
one or more motion sensor units comprising an accelerometer, gyroscope, and magnetometer,
wherein the processor is further configured to:
execute code to display a portion of content in a viewing window of the display unit, wherein the code is configured to be executed by a display unit different from the display unit of the smartwatch such that a second portion of content is to be truncated from the viewing window;
obtain data from each of the one or more motion sensor units caused by movements initiated by a user;
cause a video display controller of the display unit to send the second portion of content from a frame buffer to the display unit after receiving the data from the one or more motion sensor units;
cause the display unit to alter the viewing window, while the portion of content is unaltered, in the same direction corresponding to movements initiated by the user and display a subset of the portion of content and the second portion of content received from the frame buffer, such that the viewing window moves beyond the content to display one or more edges of the content; and
wherein the viewing window is to be moved in the direction in accordance with the movement based on the received data indicating a jerk of magnitude that exceeds a threshold.

15. The smartwatch of claim 14, wherein the display unit is circular in shape.

16. The smartwatch of claim 14, wherein the gyroscope detects the user tilting the smartwatch.

17. The smartwatch of claim 16, wherein the processor:
obtains data from the gyroscope to detect that the smartwatch is tilted in a first direction; and
causes the display unit to display the second portion of the content corresponding to the tilt in the first direction if data obtained from the gyroscope meets or exceeds one or more threshold values stored in the memory.

18. The smartwatch of claim 17, wherein the one or more threshold values comprises a magnitude of movement.

19. The smartwatch of claim 14, wherein the code indicates where a focus of the display unit is to be centered such that the display unit displays the portion of content with respect to the focused center.

20. The smartwatch of claim 14, wherein the processor causes the display unit to display different portions of content without having to obtain a second set of code specifically configured for the display unit.

* * * * *